Patented Nov. 13, 1923.

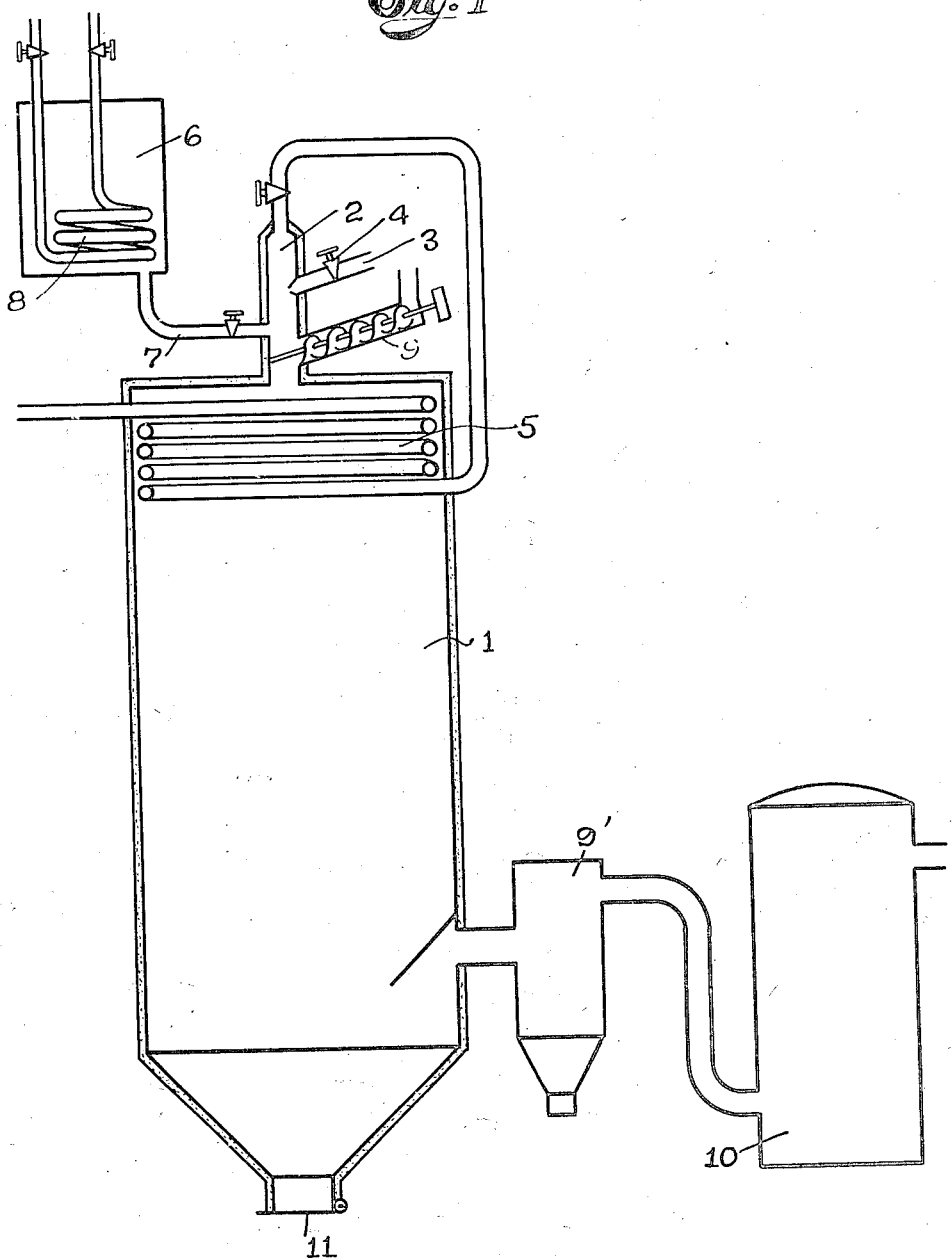

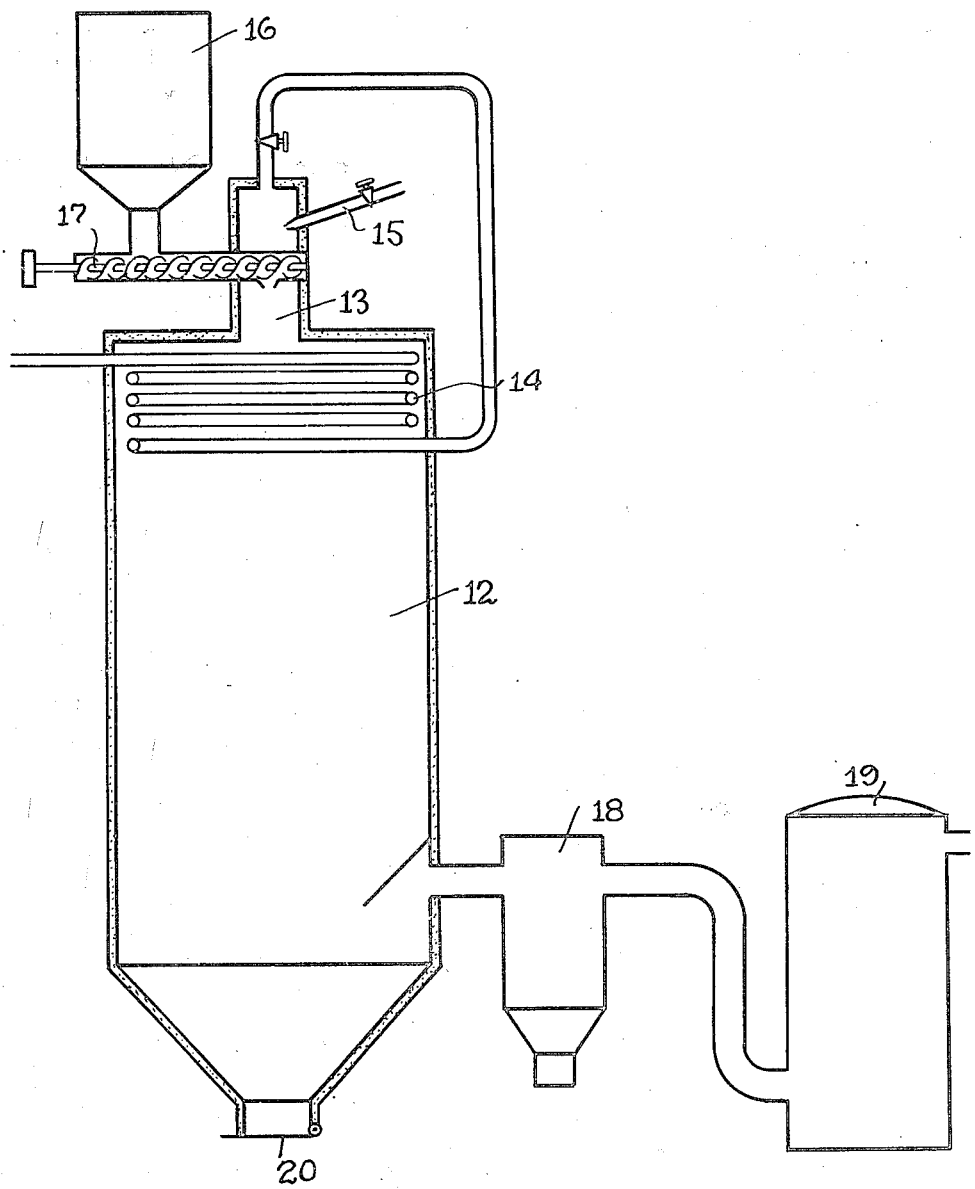

1,473,879

UNITED STATES PATENT OFFICE.

FERDINAND A. RUDOLF, OF JAMAICA, NEW YORK, AND JAMES C. RYDER, OF PASSAIC, NEW JERSEY.

METHOD FOR MANUFACTURE OF SULPHURIC ACID.

Application filed December 17, 1921. Serial No. 523,089.

*To all whom it may concern:*

Be it known that we, FERDINAND A. RUDOLF and JAMES C. RYDER, citizens of the United States, and residents, respectively, of Jamaica, Queens County, New York, and Passaic, Passaic County, New Jersey, have invented an Improvement in Methods for Manufacture of Sulphuric Acid, of which the following is a specification.

This invention relates to the method of and apparatus for manufacturing sulphuric acid.

It is an object of the invention to provide for the formation of sulphur trioxide, which is subsequently absorbed to form sulphuric acid, by intimately admixing sulphur in a finely comminuted or vaporized state and heated air, the preferred method being the spraying of sulphur either in a molten, dry or vaporized state and a catalytic agent into an atmosphere of highly heated air.

Other objects of the invention will appear as the description progresses.

In the drawings:

Figure 1 is a conventional representation of the apparatus used when elementary sulphur is sprayed into the heated air; and Figure 2 is a similar view of the apparatus used when iron pyrites is used instead of elementary sulphur.

When elementary sulphur is used it is injected in a molten or vaporized state into an atmosphere of highly heated air. The molten sulphur is forced into this atmosphere of heated air by incoming heated air under pressure, which insures the comminution of the sulphur into such a fine state that it is intimately admixed with the heated air and immediately will be oxidized.

A finely divided catalytic agent is injected into the atmosphere of heated air, and intimately admixed with the air and with the injected sulphur, so that the oxidation of the sulphur will be complete. While we do not wish to be limited to the use of any particular catalytic agent, we have found that iron pyrites functions satisfactorily in that the iron is converted to $Fe_2O_3$ which is, of course, a catalytic agent.

It is our present belief that when the molten sulphur and the iron pyrites are sprayed into the atmosphere of heated air, the intimate admixture of the same results in the formation of sulphur trioxide, the iron pyrites acting as a catalyzer to assist in the conversion of any sulphur dioxide which may be formed to sulphur trioxide. The pyrites itself is oxidized to iron oxide, $Fe_2O_3$, giving up sulphur which further increases the yield of sulphur trioxide.

The sulphur trioxide forms as a gas and passes off to suitable scrubbing and absorption apparatus, while the iron oxide, $Fe_2O_3$, gravitates from the gas as a solid and is thus separated therefrom.

The sulphur trioxide thus formed is then brought in contact with steam and sulphuric acid by which it is absorbed. The iron oxide, $Fe_2O_3$, may again be used as a catalyzer for conversion of additional sulphur in place of iron pyrites.

When iron pyrites is used instead of elementary sulphur, the pyrites is finely comminuted and injected into an atmosphere of heated air. The sulphur constituent of the pyrites is converted into sulphur trioxide and the iron constituent to the iron oxide, $Fe_2O_3$, this iron oxide being finely divided and acting as a catalytic agent to insure the complete conversion of any sulphur dioxide which may be formed to sulphur trioxide. The sulphur trioxide thus formed is passed into contact with steam and sulphuric acid, by which it is absorbed.

Thus it will be seen that when either elementary sulphur or iron pyrites is injected into the atmosphere of heated air, the sulphur is converted into sulphur trioxide and passes off as a gas, while the iron constituent of the pyrites is converted into $Fe_2O_3$ and gravitates as a solid.

Referring to Figure 1 of the drawings, which illustrates an apparatus for carrying out the method when molten sulphur is used, a furnace or generator 1 is provided at its upper end with a valved air conduit 2. A fuel burner 3 extends into this conduit 2, and it is used for the purpose of raising the temperature within the generator 1 preliminary to the injection of sulphur into the generator. This injector 3 is provided with a valve 4, so that after the generator has been raised to the proper temperature and the reaction begun, the burning of fuel may be suspended. Interpolated in the conduit 2 through which the heated air enters the generator 1, is a coil 5, which is located within the generator and through which the air passes from its source to the generator. The passage of the air through this coil 5 within the generator 1 insures the raising of the temperature of the air to a high degree before it enters the generator.

A supply reservoir 6 for the molten sulphur communicates with the conduit 2, through a valved injector 7. Located within the reservoir 6 is a heating coil 8, which operates to maintain the sulphur in a molten condition and at a predetermined and controllable temperature.

A mechanical conveyor 9 extends into the conduit 2 below the sulphur injector 7, and is adapted to feed iron pyrites or any other suitable catalyzer into the conduit 2, so that it will pass with the molten sulphur and incoming heated air into the generator 1.

In operation the temperature of the air within the generator 1 is raised to the desired degree by the burning of suitable fuel from the injector 3. The molten sulphur, together with the iron pyrites or other catalytic agent, are injected into the incoming heated air, so that the sulphur and catalyzer are in a finely divided condition and are thoroughly admixed with the incoming heated air and the heated air in the generator 1. This thorough admixing of the finely comminuted sulphur and catalytic agent with the heated air insures the burning of the sulphur to sulphur trioxide.

After the reaction has begun the heat generated thereby will be sufficient to maintain a proper temperature within the generator 1 without the burning of fuel from the burner 3. Furthermore, the heat of the reaction raises the temperature of the air in the coil 5 so that it will enter the generator 1 in a heated condition.

The sulphur trioxide formed passes off through a dust separator 9' to suitable towers 10 where it is passed through any of the well known scrubbing towers in contact with steam and sulphuric acid by which it will be absorbed. The iron oxide $Fe_2O_3$, which is formed by the reaction falls to the bottom of the generator 1, and is removed as desired through a trap 11.

Referring to Figure 2, which illustrates the apparatus used when iron pyrites is burned, instead of elementary sulphur, there is provided a generator 12 at the upper end of which is an air conduit 13, the conduit having interpolated therein a coil 14 which is located within the generator 12.

A valved fuel burner 15 extends into the conduit 13, so that the temperature of the air within the generator 12 may be raised prior to the injection of the pyrites into the generator.

A hopper 16 communicates with the air conduit 13, through a mechanical conveyor 17, illustrated in the drawing as a screw conveyor, but which may be of any suitable form. This conveyor discharges the pyrites into the conduit 13 in the direction of flow of the heated air. The iron pyrites in a finely comminuted condition is fed from the hopper 16 by the conveyor 17 into the conduit 13, the temperature within the generator 12 having previously been raised to the desired point by the fuel burner 15. The contact of the pyrites with the heated air under pressure in the conduit 13 causes the spraying of the pyrites into the generator 12 where the sulphur of the pyrites is oxidized into sulphur trioxide and the iron to the iron oxide $Fe_2O_3$.

The heat of the reaction raises the temperature of the incoming air as it passes through the coil 14 and makes unnecessary the continued burning of the fuel in the injector 15.

The sulphur trioxide gas passes off from the generator through a dust separator 18 to suitable scrubbing towers 19, where it contacts with steam and sulphuric acid and is absorbed by the latter.

The iron oxide $Fe_2O_3$ falls to the bottom of the generator 12, and may be withdrawn through a trap 20, as desired.

We claim as our invention:

1. The method of oxidizing sulphur which consists in injecting finely divided sulphur into an atmosphere of air in the presence of a catalytic agent.

2. The method of oxidizing sulphur which consists in injecting sulphur and iron pyrites into an atmosphere of heated air.

3. The method of oxidizing sulphur which consists in injecting molten sulphur and iron pyrites into an atmosphere of heated air.

4. The method of oxidizing sulphur which consists in injecting finely divided sulphur and iron pyrites into an atmosphere of heated air.

5. The method of manufacturing sulphur trioxide which consists in injecting sulphur into an atmosphere of heated air in the presence of a sulphur bearing catalytic agent.

6. The method of manufacturing sulphur trioxide which consists in injecting finely divided sulphur into an atmosphere of heated air in the presence of a finely divided sulphur bearing catalytic agent.

7. The method of manufacturing sulphur trioxide which consists in admixing elementary sulphur, a sulphur bearing catalytic agent and heated air.

8. The method of manufacturing sulphur trioxide which consists in admixing finely divided elementary sulphur, a finely divided sulphur bearing catalytic agent and heated air.

9. The method of oxidizing sulphur which comprises injecting finely divided sulphur into an atmosphere of heated air in the presence of a catalytic agent and heating said air solely by the heat of the reaction.

10. The method of oxidizing sulphur which comprises passing air through a coil in the upper portion of a cylindrical reaction chamber to preheat said air, conducting the preheated air by a circuitous route out of said coil and back into the reaction chamber proper, and injecting finely divided sulphur and catalytic material into said preheated air just prior to its second and final entrance into said reaction chamber.

11. The method of oxidizing sulphur which comprises passing air through a coil in the upper portion of a cylindrical reaction chamber, to preheat said air by the heat of the reaction, conducting the preheated air by a circuitous route out of the preheating coil and back into the reaction chamber proper and injecting finely divided sulphur and sulphur bearing catalytic material into the hot air just prior to its final entrance into the reaction chamber.

12. In apparatus of the class described a furnace, means for injecting sulphur in a finely divided condition into said furnace, means for preliminarily heating said furnace, means for injecting air through the said furnace whereby it absorbs a part of the heat of the reaction, means for injecting the heated air into the furnace, and means for injecting a catalytic agent into the mixture of sulphur and heated air.

In testimony whereof, we have signed our names to this specification this 14th day of December, 1921.

FERDINAND A. RUDOLF.
JAMES C. RYDER.